Sept. 8, 1959   R. E. BUCK ET AL   2,903,268
DUST PROOF CHUCK

Original Filed Nov. 13, 1956   2 Sheets-Sheet 1

INVENTORS
RUSSELL E. BUCK
JAMES R. BUCK
BY
Woodhams Blanchard & Flynn
ATTORNEYS

Sept. 8, 1959   R. E. BUCK ET AL   2,903,268
DUST PROOF CHUCK
Original Filed Nov. 13, 1956   2 Sheets-Sheet 2
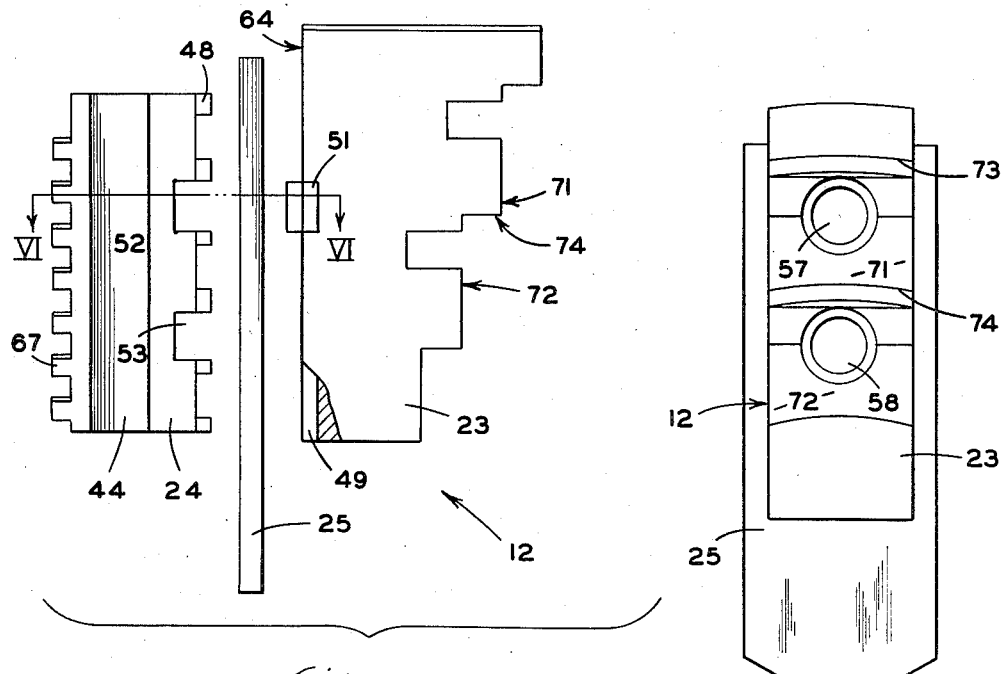
fig. 3
fig. 4
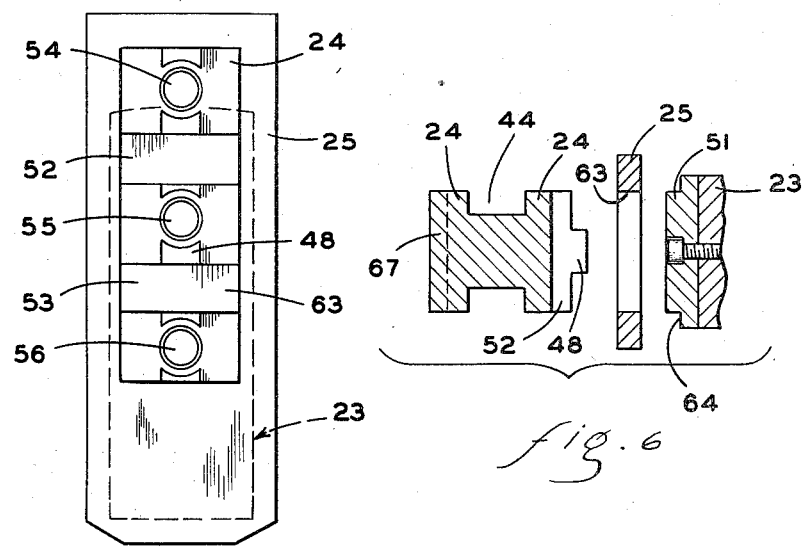
fig. 5
fig. 6
INVENTORS
RUSSELL E. BUCK
JAMES R. BUCK
BY
Woodhams, Blanchard and Flynn
ATTORNEYS United States Patent Office 2,903,268
Patented Sept. 8, 1959

2,903,268

DUST PROOF CHUCK

Russell E. Buck, Scotts, and James R. Buck, Richland, Mich., assignors to Buck Tool Company, Kalamazoo, Mich., a corporation of Michigan Original application November 13, 1956, Serial No. 621,938. Divided and this application July 29, 1957, Serial No. 674,664

8 Claims. (Cl. 279—123)

This invention relates to a chuck and particularly to a chuck whose working parts are sufficiently shielded that grinding dust and/or other waste products of a metal working operation will be prevented from entering into the interior of the chuck body and damaging the movable members contained therein. This application is a division of our co-pending application, Serial No. 621,938, filed November 13, 1956.

A problem, which is particularly serious with chucks handling articles where the work is to be done near the center thereof, such as the grinding of the central opening of a gear, but is applicable to some extent to any chuck, is the damage done to the internal parts of the chuck by the entry thereinto of grinding dust or other waste products of the working operation. While a variety of chuck constructions have been devised for preventing dust from entering the working parts of the chuck, such prior constructions have not been completely satisfactory either because they did not work satisfactorily or were too complex and/or expensive. It is therefore desirable to provide a chuck construction in which the internal parts are completely enclosed and protected from waste products.

Accordingly, it is a principal object of this invention to provide a universal chuck wherein the jaw actuating mechanism is substantially totally enclosed and, particularly, wherein access to the jaw guide ways from the radially inner ends thereof and the axial side of the chuck adjacent said jaws is completely blocked.

A further object of this invention is the provision of a universal chuck having structure for totally enclosing the axial end of said chuck adjacent to the jaws thereof, and wherein the chuck jaws are each fabricated from two releasably securable components for the purpose of increasing the radial adjustability of the chuck, while maintaining the total enclosure feature.

Other objects and purposes of this invention will become apparent to persons familiar with this type of equipment upon reading the following specification and examining the accompanying drawings, in which:

Figure 3 is an exploded, side elevational view of a jaw assembly.

Figure 4 is an end view of a chuck jaw.

Figure 5 is an end view of said jaw, similar to that shown in Figure 4, with the outer component of said jaw shown in broken lines, and in its inner position.

Figure 6 is a sectional view taken along the line VI—VI of Figure 3.

Figure 1:
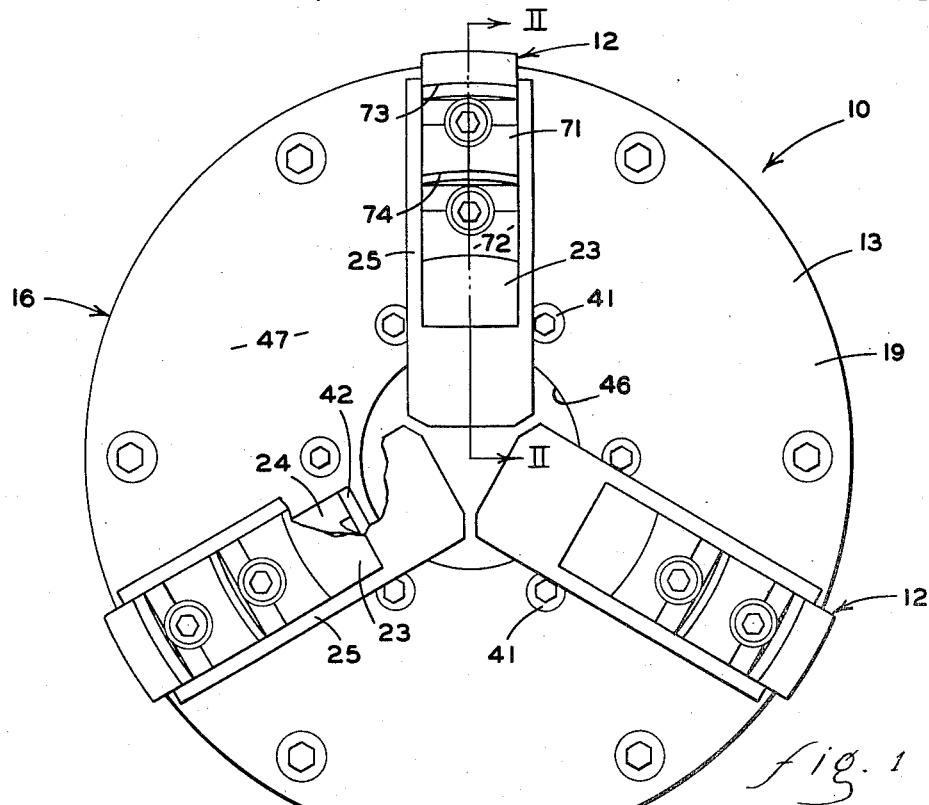
Figure 1 is an end elevational view of a chuck embodying the invention, as viewed from the jaw end thereof with parts partially broken away.

For the purpose of convenience of description, the term "front" will have reference to that axial end of the chuck upon which the jaws thereof are mounted, as appearing in Figure 1. The term "rear" will have reference to the opposite axial end of said chuck. In a similar manner, the terms "front," "rear," and derivatives thereof, will have reference to parts, such as the chuck jaws, associated with said chuck. The terms "inner," "outer," and derivatives thereof, will have reference to the geometric center of said chuck and parts associated therewith.

*General description*

Figure 2:
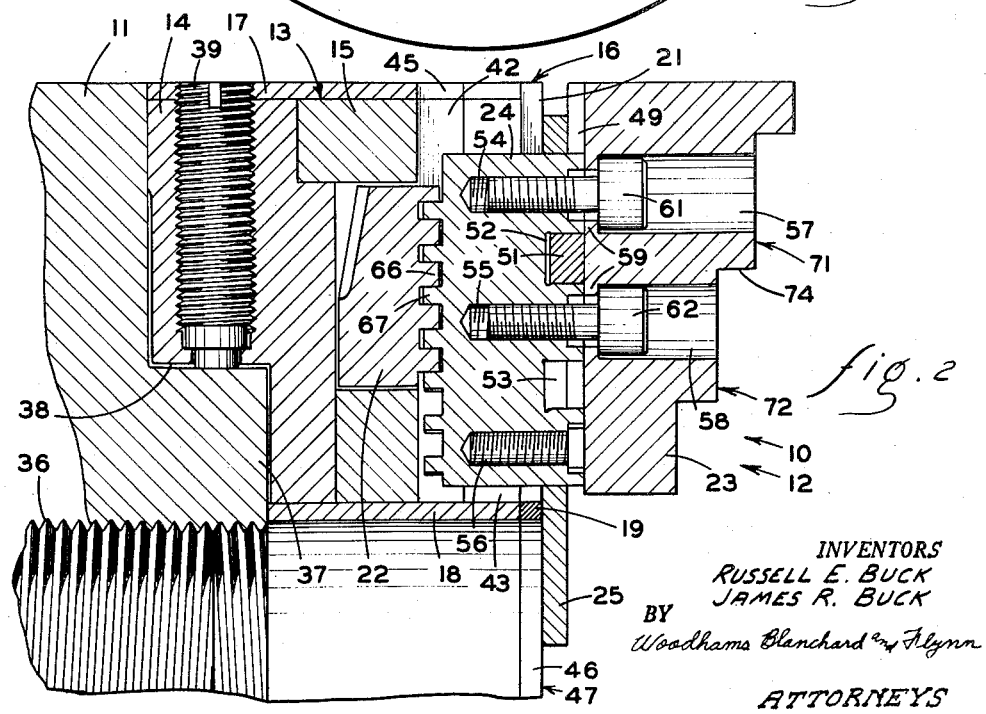
Figure 2 is a sectional view taken along the line II—II of Figure 1.

As shown in Figures 1 and 2, the invention is characterized by a universal chuck 10, having a mounting adapter 11, which may be identical to the mounting adapted described and disclosed in our Patent No. 2,639,157, whereby work carried by the jaws 12 of said chuck can be accurately centered upon the rotational axis thereof. The chuck body 13, which includes the base member 14 and cap member 15, is substantially embraced along its front surface and its radially inner and outer surfaces by a casing 16, which is comprised of an outer cylinder 17, and inner sleeve 18, and a flat ring 19, which extends between the front axial ends of said cylinder and sleeve.

The jaws 12 (Figures 2 and 3) extend into elongated openings 21 in the face of the chuck 10, where their toothed, rearward ends are engaged by a spiral gear member 22, whereby said jaws are moved radially of the chuck body 13 in a substantially conventional manner. The jaws 12, in this particular embodiment, each have front and rear components 23 and 24, respectively, which are adjustable lengthwise of each other and radially of the chuck body 13, when disposed in the openings 21. The rear component 24 of each jaw 12 is snugly received through an opening in a shield plate 25, which is held against the front ring 19 by the front component 23 of the jaw 12.

*Detailed construction*

As indicated particularly in Figure 2, the chuck body 13, which comprises the base member 14, cap member 15 and the jaw actuating mechanism therewithin including the spiral gear member 22 for effecting radial movement of the jaws 12, may be substantially identical to the corresponding structure disclosed in our Patent No. 2,639,157. Likewise, the mounting adapter 11 is supported upon a spindle 36 and has a central hub 37, which is extendable into a recess 38 in the base member 14 for engagement by radially disposed screw means 39 in substantially the same manner as discussed and described in detail in our aforementioned patent. Thus, a detailed description of these parts has been omitted from this disclosure.

The cap member 15 (Figure 2), which is secured to the base member 14 by means of the bolts 41, has a plurality, here three, of radially disposed jaw guide ways 42, which are uniformly located around said cap member. Said guide ways open through both the radially inner and outer sides of said cap member. The side walls of each guide way 42 are provided with opposing guide rails 43, which are slidably receivable into guide grooves 44 in the corresponding side walls of the rear component 24 of each jaw 12. The interengagement of said rails and grooves prevents displacement of the rear components 24 from within the jaw guide ways 42 in a direction axial of the chuck body 13, but permits radial, sliding movement of said jaws in a substantially conventional manner. The inner end of the guide way 42 is closed by the inner sleeve 18 of the casing 16.

The front ring 19 (Figure 2) of said casing 16 has an elongated opening 21 adjacent to, and aligned with, each said guide way 42, thereby permitting extension of the rear component 24 through said front ring 19. The outer cylinder 17 is provided with a jaw opening 45, which preferably corresponds to the cross-sectional contour of the guide way 42, thereby permitting the jaw 12 to move outwardly through said outer cylinder 17. The elongated jaw openings 21 in the front ring 19 extend from near the central opening 46 in said ring through the outer edge thereof and, accordingly, in alignment with the jaw opening 45.

The front side of the rear component 24 (Figure 2) extends slightly beyond the front surface 47 of the front ring 19 and has an elongated ridge 48 (Figure 6) extending lengthwise of, and frontwardly from, its front surface. The front component 23 has a groove 49 (Figures 2 and 3), into which the ridge 48 is snugly, but slidably, receivable. The front component 23 of each jaw 12 has a positioning bar 51 (Figures 2 and 6), which extends crosswise of the lengthwise extent of the rear surface thereof. The front surface of the rear component 24 is provided with a plurality, such as two in this embodiment, spaced grooves 52 and 53, into which said positioning bar 51 is snugly, but slidably, receivable when the ridge 48 is disposed within the groove 49. The rear component 24 is provided with three uniformly spaced, tapped openings 54, 55 and 56 located, respectively, outwardly of, inwardly of, and between, the grooves 52 and 53. The front component 23 is provided with a pair of bolt openings 57 and 58, having shoulders 59 near their rearward ends, and spaced from each other a distance substantially equal to the spacing between adjacent tapped openings 54, 55 and 56. Bolts 61 and 62 are disposed within the openings 57 and 58 for simultaneous, threaded engagement with either the tapped openings 54 and 55 or the tapped openings 55 and 56, depending upon the desired location of the front component 23 with respect to the rear component 24. Thus, by removing the bolts 61 and 62, the front component 23 can be adjusted radially with respect to the rear component 24 a distance equal to the centerline distance between the bolt openings 57 and 58. It will be seen that this arrangement adds substantially to the range of the chuck by increasing the effective distance of the jaw movement substantially beyond the movement of the rear component 24. Further, the front component can be reversed so that the chuck can be used for gripping the interior or exterior surface of an object.

The shield plate 25 is, in this particular embodiment, relatively flat and substantially rectangular, and is provided with a symmetrical, elongated and rectangular jaw opening 63 (Figures 5 and 6), through which the front portion of the rear component 24 is snugly and slidably receivable, as shown in Figure 2. The front component 23 is both wider and longer than the rear component 24. Thus, said front component has a surface 64 opposed to, and engageable with, the front surface on the shield plate 25 on both lateral sides of the jaw opening 63 therein. As shown in Figures 4 and 5, the front component 23 overlies both radial ends of the jaw opening 63 when it is in its radially outer position with respect to the rear component 24, but overlies only the radially inner end of the opening 63 when in its inner position. In a similar manner, the radially outward portion of the jaw guide ways 42 will be exposed from the front end of the chuck, as well as from the radially outer portion of the chuck, when both the front and rear components of the jaws are disposed in their radially innermost positions with respect to the rear component 24 as indicated in Figure 2. However, no harm results from this exposure because the critical area with respect to the exposure problem is the inner ends of the jaw guide ways 42, where chips, if they become lodged within such inner ends, are thrown by centrifugal force between the teeth 66 on the spiral gear member 22 and the teeth 67 on the rear component 24, which are engaged therewith.

The front and rear components 23 and 24, the jaw guide ways 42, and the shield plate 25 are so arranged and constructed that said shield plate 25 will be held snugly, but slidably, against the front surface 47 of the front ring 19 by the front component 23 when the rear component 24 is within a guide way 42, and the front component is secured to the front surface thereof by means of the bolts 61 and 62, in either of its two alternate positions.

The front component 23 (Figures 2, 3 and 4) is provided with a plurality of axial surfaces arranged at gradually increasing, or decreasing, distances from, and parallel with, the front surface 47 of the ring 19. In this particular embodiment, the adjacent axial surfaces 71 and 72 are located adjacent to, and inwardly of, the arcuate, radial surfaces 73 and 74, respectively. The radius of the radial surfaces 73 and 74 is advantageously approximately equal to the average radial distance between said surfaces 73 and 74 and the rotational axis of the chuck 10 for the various radial positions of the front component 23 with respect to said rotational axis.

*Operation*

The operation of the universal chuck 10, as regards that portion thereof which effects the radial movement of the jaws 12 with respect to the chuck body 13, is substantially the same as set forth in detail in our above mentioned Patent No. 2,639,157. In effecting such operation, the spiral gear member 22 is rotated around the axis of the chuck body 13 and with respect to said chuck body 13, whereby the teeth 66 on the gear member engage the teeth 67 on the rear component 24 of each jaw 12. This effects radial movement of the jaw 12.

The casing 16 and the co-operating shield plates 25 substantially totally enclose the gear actuating mechanism. Thus, contamination of, and interference with, the jaw actuating mechanism and other internal parts of the chuck by waste produced during its operation are virtually eliminated by the casing 16. Such protection is particularly important in chucking operations where very close tolerances must be held and where the effect of the mounting adapter 11, which is provided for the purpose of effecting such accuracy, would otherwise be nullified.

Although a particular, preferred embodiment of the invention has been disclosed hereinabove for illustrated purposes, it will be understood that variations or modifications thereof, which do not depart from the scope of such disclosure, are fully contemplated unless specifically stated to the contrary in the appended claims.

We claim:

1. In an open center chuck having a device for accurately centering the chuck jaws upon the rotational axis of said chuck, structure for protecting the mechanism in the chuck body, comprising: an annular chuck body; a ring secured to the jaw end of said chuck body, said ring having a plurality of elongated, radially disposed jaw openings extending from near the central opening of said ring through its periphery; a chuck jaw snugly and slidably received through, and being radially adjustable within, each of said jaw openings; a sleeve within the central opening of said chuck body and being in close engagement with the walls thereof, said sleeve extending from adjacent said ring inwardly of said chuck body; a plurality of plates disposed adjacent to said ring, said plates each having an opening through which one of said chuck jaws extends, and said chuck jaws having surfaces opposed to said ring for holding said plates against said ring, said plates having a radially inner portion abutting against the external surface of said ring adjacent the central opening thereof.

2. In an open center chuck having a device for accurately centering the chuck jaws upon the rotational axis of said chuck, structure for protecting the mechanism in the chuck body, comprising: an annular chuck body; a ring secured to the jaw end of said body, said ring having a plurality of elongated, radially disposed jaw openings extending from near the central opening of said ring through its periphery; a chuck jaw snugly and slidably received through, and being radially adjustable within, each of said jaw openings; an outer cylinder secured to said ring and closely surrounding said chuck body, said outer cylinder having jaw openings therethrough radially aligned with said jaw openings in said ring whereby said chuck jaws may move radially through said outer cylinder; a sleeve within the central opening in said chuck body and being in close engagement with the walls thereof, said sleeve contacting the inner surface of said ring; a plurality of plates contiguous with the external surface of said ring, said plates each having an opening through which one of said jaws extends, and said chuck jaws having surfaces opposed to said ring for holding said plates against said ring.

3. A chuck as set forth in claim 2 wherein said jaws are each comprised of a rear component disposed within said chuck body and having a portion extending through and outwardly of said ring, said rear component having a plurality of locating recesses therein and having a series of equally radially spaced threaded openings therein; a front component secured to said rear component, said front component having a locating element thereon receivable into one of said recesses at a time and having a plurality of holes therethrough alignable with said openings; threaded fastening means extending through said holes and secured in said openings whereby said front component may be secured to said rear component in a plurality of radially spaced positions and may be reversed with respect thereto, said front component having a plurality of radially spaced, axially offset shoulders thereon whereby said front component may grip either the interior or exterior surface of a workpiece.

4. A chuck construction, comprising: a chuck body having a central opening and having a plurality of radially disposed guideways therein; a chuck jaw within each of said guideways and mounted for radial movement therewithin; means within said chuck body for moving said chuck jaws radially; means defining an annular wall closing one face of said chuck body, said wall having a plurality of radially extending openings therethrough through which said jaws extend, said openings extending substantially from the radially inner edge to the radially outer edge of said annular wall; an inner sleeve extending axially from the radially inner edge of said annular wall into the central opening of said chuck body, said sleeve lying closely adjacent the wall of said central opening to seal said central opening to prevent entry of particles into said chuck body; a plate associated with each of said chuck jaws, each said plate being of greater width than the corresponding opening in said annular wall and lying in front thereof so that it is contiguous therewith, each said plate having an opening therethrough through which its associated chuck jaw extends and each said plate having a portion located radially inwardly of its chuck jaw overlying said opening in said wall for said chuck jaw so that said portion prevents entry of particles into said chuck body regardless of the radial position of said jaws.

5. A chuck construction comprising: a chuck body having a central opening and having a plurality of radially disposed guideways in one face thereof; a chuck jaw within each of said guideways and mounted for radial movement therewithin; means within said chuck body for moving said chuck jaws radially; a casing embracing the radially outer and radially inner surface and said one face of said chuck body, said casing including an outer cylinder surrounding the outer surface of said chuck body and lying adjacent thereto, an inner sleeve within said central opening and lying closely adjacent the wall of said central opening and a ring fixedly secured with respect to said outer cylinder and said inner sleeve and contacting same adjacent its radially outer and radially inner edges respectively, said ring overlying said one face of said chuck and having a plurality of radially extending openings therethrough through which said chuck jaws extend; a plate associated with each of said chuck jaws, each said plate having an opening therethrough through which its associated chuck jaw snugly extends and also having a radially inner portion located radially inwardly of its chuck jaw, said plates being contiguous around their peripheries with said ring to seal the openings therein.

6. A chuck construction according to claim 5 wherein each of said chuck jaws has a rear component located within said chuck body and having a spiral gear thereon, said rear component being radially movable in said guideways, said inner sleeve extending into said central opening from said one face to a position within said chuck body located inwardly of said rear components of said chuck jaws, said sleeve being contiguous with said ring at one axial end thereof and being contiguous with said chuck body at the other axial end thereof whereby particles are prevented from contacting said spiral gears by passing through said central opening, each of said plates surrounding its associated chuck jaw and being in slidable contact with said ring so that when said chuck jaws are moved outwardly said plates will move outwardly therewith, said radially inner portion of said plates being of sufficient radial extent that it will at all times be contiguous with the radially inner portion of the ring regardless of the radial position of the chuck jaws.

7. A chuck construction, comprising: a chuck body having a plurality of radially disposed guideways in one face thereof; a chuck jaw within each of said guideways and mounted for radial movement therewithin; means within said chuck body for moving said chuck jaws radially; each of said chuck jaws including a rear component and a front component whose adjacent faces have interfitting means thereon for selectively locating said front component in one of a plurality of radially spaced and reversible positions with respect to said rear component, said front component having a plurality of axially offset, radially spaced shoulders on the other face thereof; said rear component having a series of equally radially spaced threaded openings therein; said front component having a plurality of equally radially spaced openings therethrough of spacing corresponding to the spacing of said threaded openings; and bolts extending through said openings in said front component and threaded into said threaded openings and securing said front and rear components together, said front component being adjustable radially with respect to said rear component and also being reversible with respect thereto so that said front component may grip either the interior or exterior surface of a workpiece.

8. A chuck construction, comprising: a chuck body having a plurality of radially disposed guideways in one face thereof; a chuck jaw within each of said guideways and mounted for radial movement therewithin; means within said chuck body for moving said jaws radially; each of said chuck jaws including a rear component and a front component, said rear component having a series of equally radially spaced threaded openings therein in the face thereof adjacent said front component, said rear component also having a plurality of locating grooves in said face and located between said threaded openings; said front component having a positioning bar extending from the face of said front component adjacent said rear component into one of said grooves, said front component having a series of axially offset, radially spaced surfaces defining axially extending shoulders on the other face thereof, said front component having a plurality of openings therethrough spaced radially from each other an equal distance corresponding to the spacing of said threaded openings; bolts extending through said openings in said front component and threaded into said threaded openings and securing said front and rear components together, said front component being adjustable radially with respect to said rear component and also being reversible with respect thereto so that said front component may grip either the interior or the exterior surface of a workpiece.

References Cited in the file of this patent

UNITED STATES PATENTS

| | | |
|---|---|---|
| 2,356,198 | Barry et al. | Aug. 22, 1944 |
| 2,799,512 | Buck et al. | July 16, 1957 |

FOREIGN PATENTS

| | | |
|---|---|---|
| 84,547 | Norway | Nov. 8, 1954 |